(12) United States Patent
Christensen

(10) Patent No.: US 6,366,946 B1
(45) Date of Patent: Apr. 2, 2002

(54) CRITICAL CODE PROCESSING MANAGEMENT

(75) Inventor: Eric R. Christensen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/213,016

(22) Filed: Dec. 16, 1998

(51) Int. Cl.[7] .......................... G06F 9/00; G06F 17/30
(52) U.S. Cl. .................................... 709/106; 707/8
(58) Field of Search ............................. 707/1–206, 2, 707/8, 10; 709/106–108

(56) References Cited

U.S. PATENT DOCUMENTS

| | | | | |
|---|---|---|---|---|
| 5,138,713 A | * | 8/1992 | Loten ........................... | 709/104 |
| 5,283,896 A | * | 2/1994 | Temmyo et al. ............. | 709/104 |
| 5,289,588 A | * | 2/1994 | Song et al. ................... | 395/425 |
| 5,504,898 A | * | 4/1996 | Klein ............................ | 709/101 |
| 5,515,538 A | * | 5/1996 | Kleiman ....................... | 710/260 |
| 5,630,136 A | * | 5/1997 | Davidson et al. ............ | 709/106 |
| 5,742,825 A | * | 4/1998 | Mathur et al. ............... | 709/300 |
| 5,832,484 A | * | 11/1998 | Sankaran et al. ............. | 707/8 |
| 5,852,731 A | * | 12/1998 | Wang et al. .................. | 709/100 |
| 5,948,097 A | * | 9/1999 | Glew et al. ................... | 712/220 |
| 5,995,998 A | * | 11/1999 | Furlani et al. ............... | 709/102 |
| 6,021,425 A | * | 2/2000 | Waldron, III et al. ........ | 709/103 |
| 6,061,709 A | * | 5/2000 | Bronte .......................... | 709/103 |
| 6,006,247 A | * | 9/2000 | Browning et al. ........... | 709/102 |
| 6,119,115 A | * | 9/2000 | Barr .............................. | 707/8 |
| 6,167,423 A | * | 12/2000 | Chopra et al. ................ | 709/100 |
| 6,212,542 B1 | * | 4/2001 | Kahle et al. .................. | 709/102 |
| 6,247,025 B1 | * | 6/2001 | Bacon ........................... | 707/206 |

* cited by examiner

*Primary Examiner*—Maria N. Von Buhr
(74) *Attorney, Agent, or Firm*—Woodcock Washburn LLP

(57) ABSTRACT

A technique for processing a critical code section which cannot be executed concurrently by more than one executable unit (e.g., a thread, a process, a fiber, etc.). A first executable unit prepares a packet containing a "work request," which describes work to be performed by the critical section. If the critical section is not in use by a second executable unit, then the first executable unit enters the critical section and performs the work described in the packet. If the critical section is in use by a second executable unit, then the second executable unit performs the work described in the packet on behalf of the first executable unit, thereby alleviating the necessity for the first executable unit to enter the critical section. In addition to the work request, the packet may also contain: a status indicating whether the work request has been performed, an event to be signaled upon completion of the work request, and/or a list pointer that may be used to link packets together in a linked list.

31 Claims, 4 Drawing Sheets

CRITICAL CODE PROCESSING MANAGEMENT

FIELD OF THE INVENTION

This invention relates generally to electronic data processing software, and more specifically to processing highly contested critical areas of computer software.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1998, Microsoft Corporation, All Rights Reserved.

BACKGROUND OF THE INVENTION

Today many computer programs are intended to be run in multi-processor and/or multi-threaded environments. The advantages of such an environment include more efficient and faster execution of computer programs. This is due to the fact that multiple processors can perform tasks in parallel with one another, that is, the processors can work on multiple programs, or on multiple copies of the same program simultaneously.

There are times, however, when it is necessary to limit access to certain sections of computer programs to one process or thread at a time. A section of code that must be limited in this manner is what is known in the art as a "critical section". Critical sections of code often serve as a gate keeper for controlling access to a particular resource or data structure. It is often the case that if multiple processes were allowed access to the critical section, a data structure will be corrupted or a deadlock situation will occur.

Previous systems have attempted to control access to critical sections through the use of an operating system provided semaphore having at least two states. A first state indicates that the section is free, that is, it is available for use by a process. A second state indicates that the critical section is currently in use. A process desiring to execute a critical section first checks the semaphore to see if any other process or thread is currently using the critical section. If another process is in the critical section, the process or thread blocks until the semaphore indicates the critical section is free. If no other process is using the critical section, the process or thread enters the critical section, and sets the semaphore to busy to keep other processes from entering until the current process is done with the critical section.

When a process or thread that was blocked by another process executing in the critical section becomes ready to run, a context switch typically occurs. A context switch is a sequence of instructions that are typically executed by an operating system that cause the system to switch execution from a current process to another process that is ready and waiting to run. In this case, the context switch is executed to allow the formerly blocked process to execute in the now free critical section.

Context switches are relatively expensive in terms of processor time. This is due to the fact that a relatively large amount of data must be manipulated in order to prepare the processor to run a different process or thread. In certain operating systems, context switches can take anywhere from 1000 to 10,000 instruction cycles to accomplish.

The table below illustrates a typical sequence in which two threads need to execute a critical section of code, and in which semaphores are used to control access to the critical section. The table shows the state of each process during their execution at four significant points in time labeled T1–T4.

TABLE 1

| TIME | Thread 1 | Thread 2 |
|---|---|---|
| T1 | Enters critical section | |
| T2 | Executes in critical section | Reaches critical section; waits. |
| T3 | Leaves critical section | |
| T4 | | Enters critical section |

The period of time between T4 and T3, referred to as the "transition time", can have a significant impact on the total throughput of processes and threads needing to execute the critical section. During the time period the operating system must block thread 2 until a processor becomes available to run the thread. Once a processor is available, the operating system must perform a context switch from whatever was running on the processor to thread 2. Thus, the time period between T3 and T4 can be comparatively large. This makes the effective critical section execution time to be (T4–T1); that is, the critical section may be entered at most 1/(T4–T1) times per second.

In addition, the transition time may be large compared to (T3–T1), the actual amount of time spent inside the critical section. If there are many threads waiting for the critical section, i.e. the critical section is a highly contested critical section, then the transition time can be a dominant, limiting factor in overall throughput of the system.

Therefore, there is a need for a more efficient system for managing the processing of critical sections of a computer program.

SUMMARY

The above-identified problems, shortcomings and disadvantages with prior systems, as well as other problems, shortcoming and disadvantages, are solved by the present invention, which will be understood by reading and studying the specification and the drawings.

The system provides a highly efficient mechanism for processing critical sections of code. Executable units such as threads, processes, and fibers place data describing work to be performed by the critical section in a data packet. The data packets are collected in a list of packets. The first thread to enter the critical section of code executes all of the work units on the list, thereby executing at least some of the work units on behalf of other waiting threads.

The system provides for higher throughput and efficiency than previous systems, because the blocked threads tend to resume execution sooner, thereby reducing the transition time period.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level overview of the invention is presented. In the third section, a method for efficiently processing a critical section is described. Finally, in the fourth section, a conclusion of the detailed description is provided.

Hardware and Operating Environment

Figure 1:
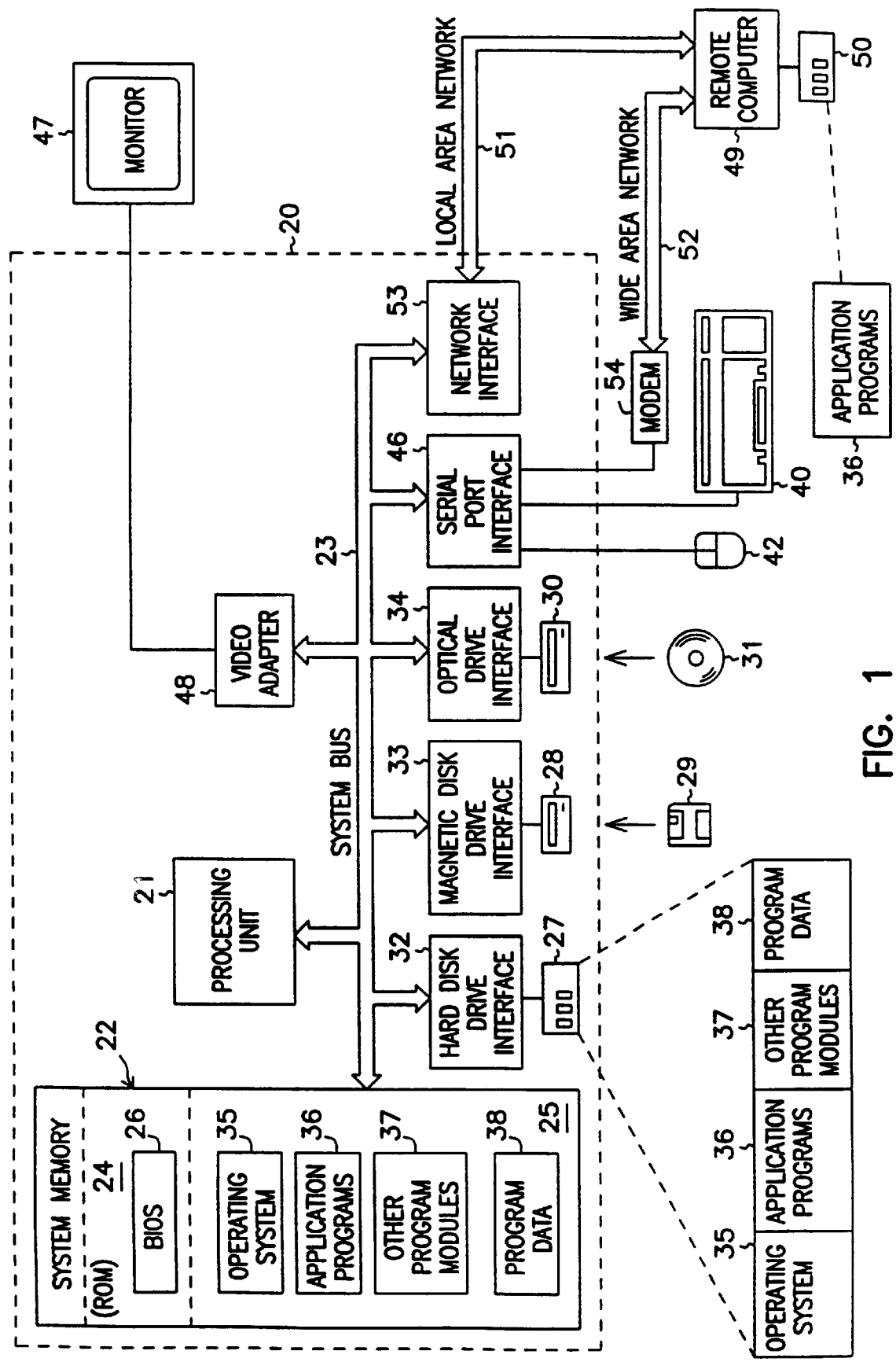
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

A system level overview of the operation of an exemplary embodiment of the invention is described by reference to FIG. 2. The concepts of the invention are described as operating in a multiprocessing, multithreaded operating environment on a computer, such as computer 20 in FIG. 1. In this environment, system 200 includes a first thread 220 and a second thread 225 that interface with a resource component 205. Resource component 205 exposes code containing a critical section 210 and packet lists 215 and 217.

Resource component 205 is a software component providing functions and data that control a particular shared resource in a computer system. In one embodiment of the invention, the resource component contains functions and data that operate on a file containing a log of operations performed in a SQL database. Those skilled in the art will appreciate that many types of shared resources are typically provided by a computer system. For example, resource component 205 may control access to a shared timestamp, a shared counter, device control data structures, or other resources that are intended to be shared and accessible by multiple processes.

Critical section 210 is a module comprising computer instructions that act as a guard for code that performs operations on or using a shared resource. For example, a producer thread may use a critical section to place a resource on a list, while a consumer thread may use the same critical section to extract a resource from the list. Access to the critical section must be limited to one process or thread at a time. In other words, once a thread or process has control of, or owns a critical section, no other thread or process must be allowed to execute in the critical section. This is because if multiple processes or threads are allowed to execute in the critical section simultaneously, there is an unacceptable risk of system crashes, data corruption, or other undesirable effects.

In one embodiment of the invention, critical section 210 contains code that writes a log entry to a disk file containing a log of operations performed on a SQL database. In this embodiment, a critical section is required to prevent a log entry generated and written by one thread to be corrupted by a log entry that is concurrently generated and written by another thread.

Threads 220 and 225 are executable computer programs desiring to use a shared resource provided by resource component 205. A thread, as is known in the art, is an independently executable portion of a process or program. A thread typically has less overhead associated with it than a regular process, and therefore can be executed more efficiently by the operating system. In one embodiment of the invention, threads 220 and 225 is a thread invoked by a database server, such as SQL Server by Microsoft Corporation, to perform various database-related operations.

Those skilled in the art will appreciate that other components running in an operating system may desire to use a shared resource provided by a resource component 205. These components may run in addition to or instead of threads. For example, in various embodiments of the invention processes and fibers (lightweight threads that are scheduled by the application itself, rather than the operating system) also interface with resource component 205, and are included within the scope of the invention.

Also, the threads, processes and fibers accessing the critical section 210 may comprise multiple instances or copies of the same thread, process or fiber, or they may be distinct program units that require access to the same shared resource.

Figure 5:
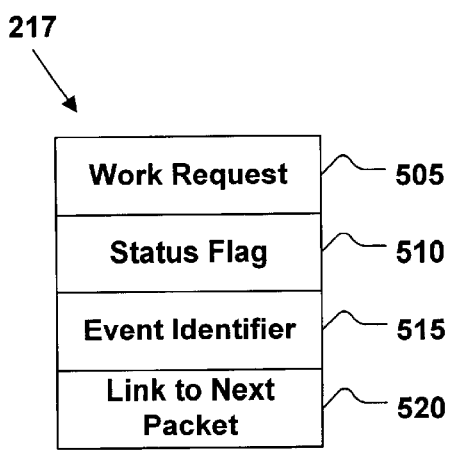
FIG. 5 is a diagram representing a packet data structure used by an embodiment of the invention.

When a thread 220 or 225 requires access to a shared resource, it first creates a packet 217. FIG. 5 provides a more detailed view of packet 217. Packet 217 is a data structure containing a work request 505 that supplies data describing the work that is to be performed by the code in critical section 210. In one embodiment of the invention, the packet also contains a status flag 510 indicating whether the work described in the packet has been completed or is still pending. In a further alternative embodiment of the invention, the packet includes an event data field 515 specifying an event that is to be signaled when the work described in the packet has been completed. Those skilled in the art will recognize that a particular operating system will provide event signaling capability unique to that operating system, the invention is not limited to any particular event signaling method.

After creating packet 217, the thread then checks to see if it can enter the critical section. If it can, the critical section executes the work described in the packet. After completing work on the packet, in one embodiment of the invention the critical section 210 sets the status flag in the packet to indicate that the work has been completed. In a further alternative embodiment of the invention, the critical section 210 signals an event to indicate that the work has been completed.

While first thread 220 is executing in the critical section 210, it is possible that a second thread 225 will require access to the shared resource component 205. Second thread 225 also creates a data packet 217 describing the work to be done in the critical section. When second thread 225 checks to see if it can enter the critical section, it will find that it is currently occupied by thread 220. Because it cannot immediately enter the critical section 210, second thread 225 places its packet on a packet list 215.

Packet list 215 is a data structure that maintains a list of packets 217. In one embodiment of the invention, the list is implemented using a linked list data structure, with a list head variable indicating the first entry in the list. A pointer in each packet (520 in FIG. 5) is used to locate the next packet entry in the list. If the list head is null, the list is empty, and the next packet inserted in the list becomes the list head. It is desirable to maintain the packet list without using a critical section. In one embodiment of the invention, this is accomplished through the use of a compare/exchange instruction, described in detail below with reference to FIG. 3.

Those skilled in the art will appreciate that alternative data structures can be used to implement a list structure. For example, an array, a doubly linked list, or other such structure could be used for list 215, and such structures are within the scope of the invention.

In one embodiment of the invention, multiple packet lists are maintained by the system. One list 215 is a current list of packets being executed in the critical section 210. A second list 219 contains packets added by threads after the critical section 210 begins to process the first list. It is desirable to maintain at least two packet lists, because list synchronization is simplified and the chance for list corruption due to simultaneous access is eliminated, however the invention is not limited to any particular number of packet lists.

Before leaving critical section 210, thread 220 checks to see if any other threads, processes or fibers have placed packets on a list 215. If so, the thread 220 stays in the critical section and executes the packet on behalf of the thread that placed the packet on the list. In the example described here, thread 220 enters critical section 210 and perform on behalf of itself and thread 225. Thread 220 will continue to stay in the critical section, executing packets 217 in list 215 until all packets have been processed. At that point, thread 220 leaves critical section 210, which then becomes available for subsequent access by threads, processes and fibers.

In one embodiment of the invention, thread 225 is notified that the packet it placed on the list has been completed when an event specified in the packet is signaled. As discussed above, the particular mechanism to signal the event will be operating system specific. In an alternative embodiment of the invention, thread 225 checks the status flag in the packet to determine that the work specified in the packet has been completed.

The exemplary system 200 has been described in the context of two threads, 220 and 225, which desire to execute a critical section of code. However, the invention is not limited to any particular number of threads, process or fibers. In certain environments in which the invention may be practiced, the number of threads potentially competing for a critical section of code can be arbitrarily large, limited only by the number of threads or processes that the operating system supports.

In one embodiment of the invention, resource component 205 and its associated functions and data are implemented as a class in an object-oriented programming language such as C++. However, the invention is not so limited, and the resource component may be implemented by functions, macros, or templates as is known in the art. In addition, resource component 205 may be implemented using any of a number of different programming languages.

Method For Processing Highly Contested Critical Sections

The previous section presented a system level description of an embodiment of the invention. In this section, methods within embodiments of the invention will be described with reference to flowcharts describing tasks to be performed by computer programs implementing the method using computer-executable instructions. The computerized method is desirably realized at least in part as one or more programs running on a computer—that is, as a program executed from a computer-readable medium such as a memory by a processor of a computer. The programs are desirably storable on a computer-readable medium such as a floppy disk, CD-ROM, or Compact Flash (CF) card for distribution, installation and execution on another (suitably equipped) computer. The programs may also be stored on one computer system and transferred to another computer system via a network connecting the two systems, thus at least temporarily existing on a carrier wave or some other form of transmission.

Figure 3:
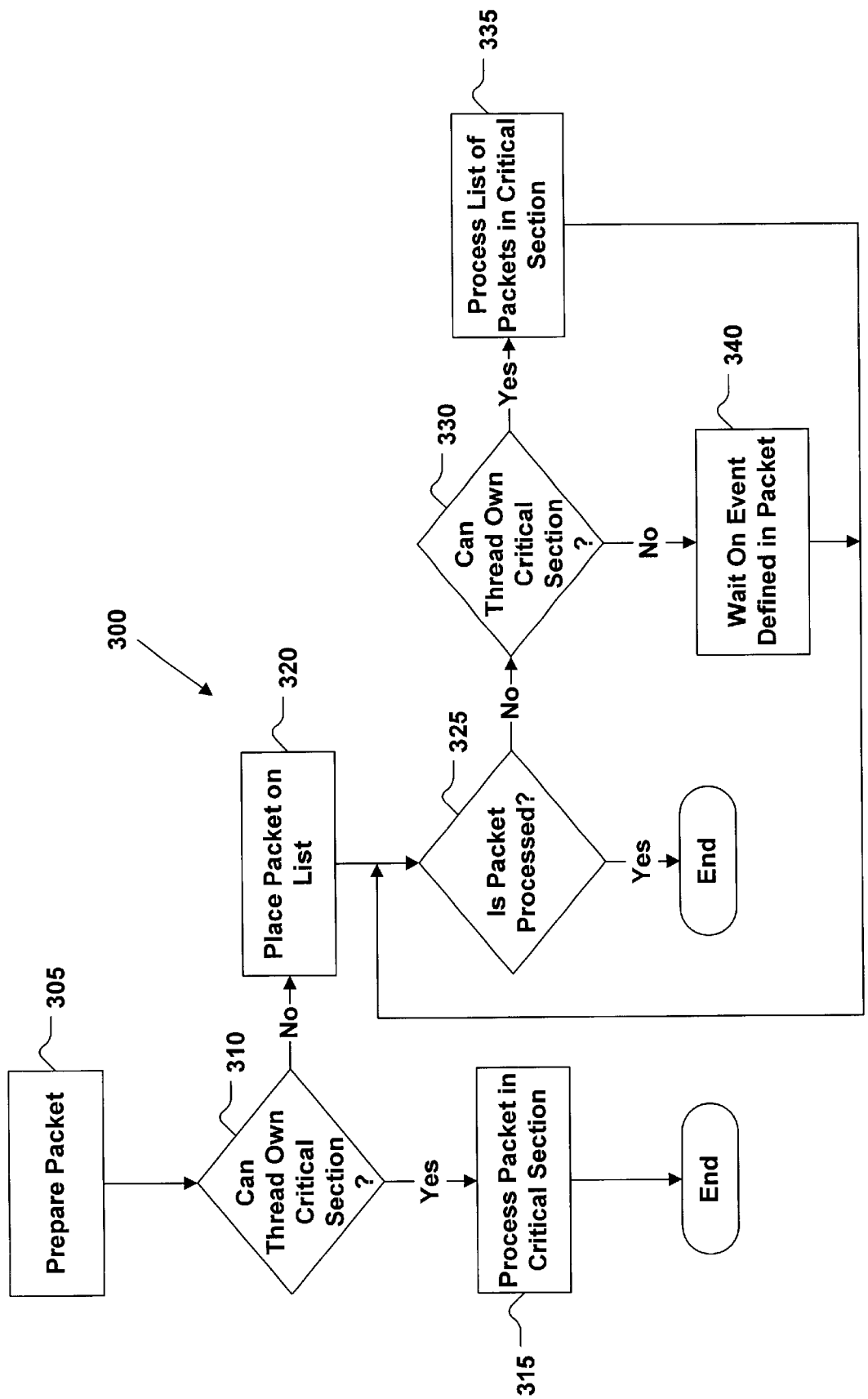
FIG. 3 is a flowchart illustrating a method according to one embodiment of the invention.

In FIG. 3, a flowchart is shown that illustrates a method for processing a highly contested critical section of code according to an embodiment of the invention. The method begins when a thread or process needs to access a resource through the use of a critical section of code. The thread prepares a packet describing the work the critical section is to perform regarding the resource (block 305).

The method then checks to see if the thread can own the critical section (block 310). In other words, the method checks to make sure the thread can obtain exclusive access to the critical section and exclude all other threads, processes and fibers from controlling the critical section.

In one embodiment of the invention, this check at block 310 is performed using a compare/exchange instruction common on computer processors used as part of multiprocessor or multithreaded systems. The compare/exchange instruction is an instruction executed by a computer processor that compares a memory location specified in the instruction to a particular value. If the memory location has the particular value, a new value is placed in the memory location, otherwise the instruction fails.

The instruction is typically used as a fast and efficient mechanism to synchronize access to resources accessed by multiple processes in a system. If the compare/exchange succeeds, the process is free to use the resource because no other processes are currently using it. The memory location then is immediately and atomically updated to a new value, thereby causing subsequent compare/exchange instructions to fail. The failure indicates to the process invoking the instruction that the resource is currently busy. Because the instruction is executed atomically, there is no chance for other processors to erroneously determine that the memory location indicates that the resource is available.

While the use of an compare/exchange instruction is desirable, the invention is not limited to this particular mechanism, and in an alternative embodiment of the invention, a semaphore mechanism, as is known in the art, is used to control access to the critical section.

Figure 4:
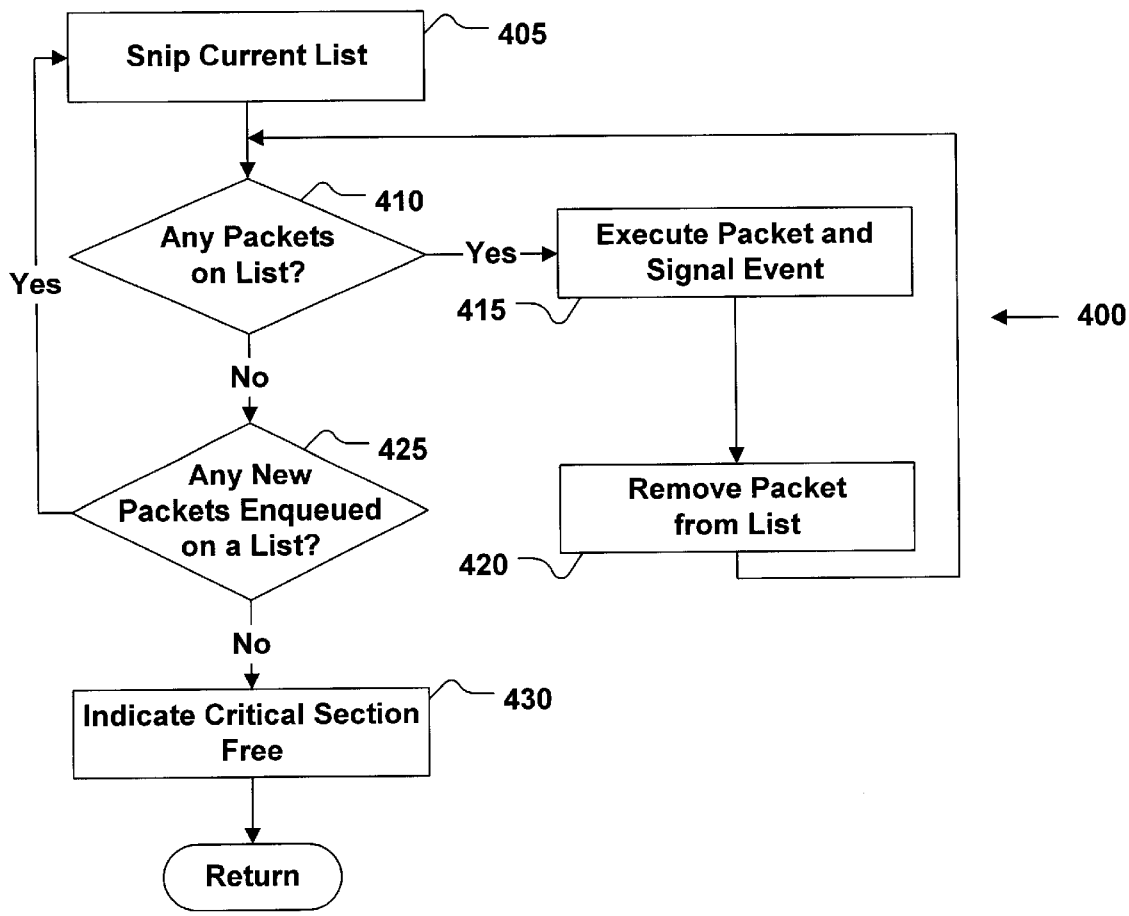
FIG. 4 is a flowchart providing further detail for list processing performed by an embodiment of the invention using the method illustrated in FIG. 3.

If the thread can take control of the critical section, the method then enters the critical section and processes the packet (block 315). A more detailed description of the tasks performed by the method in the critical section is presented below in reference to FIG. 4.

Figure 2:
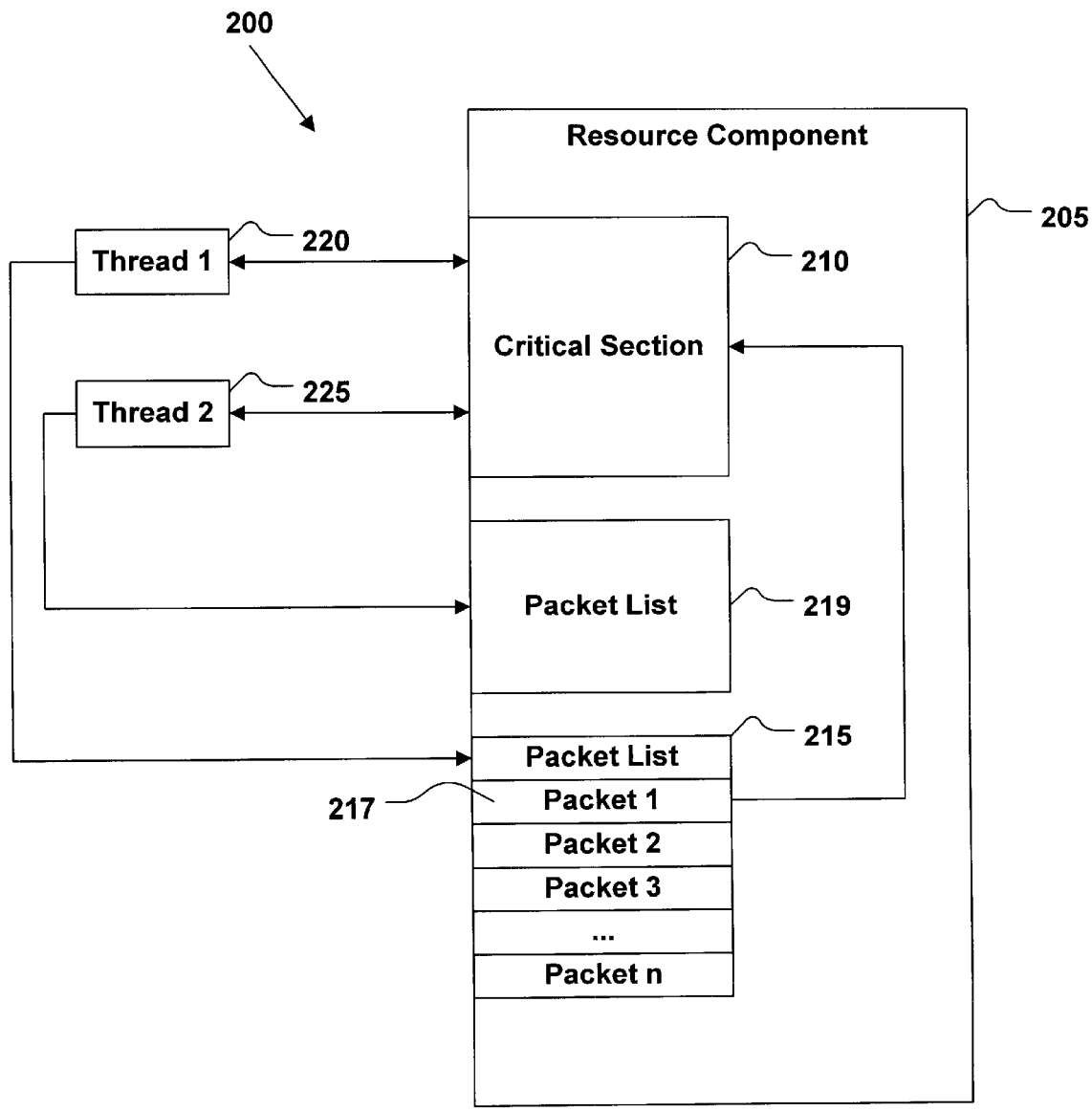
FIG. 2 is a diagram showing the major components of a software system of one embodiment of the invention.

If the method cannot own the critical section, that is, if another thread, process or fiber has current control of the critical section, the method then places the packet on a packet list, such as packet list 215 (FIG. 2). In one embodiment of the invention, where a linked list is used to implement the packet list, the list head is checked for a null value. If the list head is null, the null value is replaced with a pointer to the current packet. If the list head is not null, the packet is linked to the last packet in the list. In one embodiment of the invention, the compare/exchange instruction is used to determine that it is safe to manipulate the list in the above manner.

Those skilled in the art will appreciate that a packets position in the list could be determined base on the order of entry, or based on a priority value assigned to the packet.

Next, the method checks to see if the packet has been processed (block 325). It is desirable for the method to make this check, because it possible that the packet may be processed by a second thread currently in control of the critical section immediately upon being placed in the list. This is because in a multiprocessor environment, multiple processes can be executing concurrently, and it is possible that the second thread detected the addition of the newly created packet and proceeded to process it.

If the packet has been processed, the method terminates. Otherwise, the method checks again to see if the thread can own the critical section (block 330). In one embodiment of the invention, if the critical section is not free, that is, it is in use by another thread, the method waits for the occurrence of an event defined in the packet (block 340). When the event occurs, the method loops back to block 325 to check to see if the packet was processed.

If the critical section is free, the method then processes each packet in the list (block 335). Details on this processing and the processing in block 315 are provided in reference to FIG. 4. In one embodiment of the invention, the processing of a list of packets starts by "snipping" the current list (block 405). A pointer to the list is saved for later use by the process, and the current list head is reset to null. This causes a new list to be formed when other threads add packets for processing. Snipping the list is desirable, because it prevents the list from becoming corrupted by simultaneously adding newly created packets and removing completed packets from the list. In one embodiment of the invention, a compare/exchange instruction is used to determine that it is safe to snip the list.

Next, block 410 is the top of a loop that checks to see if there are packets on the list that remain to be processed. If so, the method then proceeds to perform the work request specified by the data in the packet (block 415). Typically, this request will be related to accessing a shared resource. In one embodiment of the invention, the shared resource is a file containing a log of operations performed by a database server. In a further alternative embodiment of the invention, the database server is SQL Server Version 7.0 from Microsoft Corporation. The invention is not limited to any particular database system, nor is the invention limited to databases in general. The resources accessed in the critical section can be any type of shared resource used within a computer system.

In addition, the method signals that work for the packet has been completed. In one embodiment of the invention, an event specified in the packet is signaled. It is desirable to signal an event, because threads waiting for the work defined in the packet to be completed will detect the event and then proceed to do other work.

After completing work on the packet, the method removes the completed packet from the list (block 420) and proceeds back to the top of the loop at block 410 to look for more unprocessed packets.

When the check at block 410 determines that there are no unprocessed packets left in the current list, the method then checks to see if any new lists have been created (block 425).

If there is a new list, the new list is made the current list, and the method returns to block 405 to process the list in the manner described above.

If the check at block 425 indicates that no new lists exist, the method then indicates that the critical section is free, that is, it is available for use by other threads. In one embodiment of the invention, this indication is accomplished by setting the memory location examined by the compare/exchange instruction to a value indicating that the critical section is free. In an alternative embodiment, a semaphore is set to indicate the critical section is free. Those of ordinary skill in the art will recognize that other alternative mechanisms exist that can be used to indicate the critical section is available for use by other threads, processes or fibers.

From the foregoing detailed description, it will be appreciated by those skilled in the art that embodiments of the invention provide advantages over previous systems. Because the thread currently having control of a critical section executes work on behalf of all threads having outstanding need of the critical section, blocked threads tend to resume execution sooner. This reduces the transition time for work requests requiring execution in the critical section and improves throughput.

In addition, the system provides increased throughput due to improved processor cache utilization. Because the same thread executes packets in the critical section on behalf of other threads, it is probable that the resources protected by and code executed within the critical section will be found in the cache for successive packets. This is not the case if the operating system must perform context switches between threads, because the new thread may run on a different processor, and thus not benefit from the resources and code having been loaded into the first processor's cache.

CONCLUSION

Processing highly contested critical sections of code has been disclosed. In particular, systems and methods for a thread to perform work on behalf of other threads has been described. Although specific embodiments have been illustrated and described herein, it will be appreciated by those of ordinary skill in the art that any arrangement which is calculated to achieve the same purpose may be substituted for the specific embodiments shown. For example, while the detailed description has been primarily discussed in terms of threads, the methods also apply to processes and fibers. In addition, certain embodiments of the invention have been discussed in the context of the SQL Server database system from Microsoft Corporation. However the method can be implemented within database systems such as Oracle, Sybase, Informix or other database systems. This application is intended to cover any adaptations or variations of the present invention. Therefore, it is manifestly intended that this invention be limited only by the following claims and equivalents thereof.

I claim:

1. A computerized method for processing a critical section of code comprising:

preparing a first packet containing a first work request;

determining if the critical section of code is in use by an executable unit; and if the critical section is not in use, performing the tasks comprising:

processing the first packet according to the first work request, processing each packet on a list of packets, each of said packets processed according to a work request in the packet, otherwise placing the first packet on the list of packets.

2. The method of claim 1, further comprising:
determining if the first packet has been processed; and
if the first packet has not been processed then performing the tasks comprising:
  determining if the critical section of code is in use by an executable unit,
  if the critical section is in use, then waiting for an event defined in the first packet,
  otherwise processing each packet on the list of packets, each of said packets processed according to a work request in the packet.

3. The method of claim 1, wherein the critical section of code controls a shared resource.

4. The method of claim 3, wherein the shared resource is a resource of a database server.

5. The method of claim 4, wherein the database server is selected from the group consisting of: SQL Server, Oracle, Sybase, and Informix.

6. The method of claim 1, wherein the executable unit is selected from the group consisting of: a thread, a process, and a fiber.

7. The method of claim 1, wherein determining if the critical section is in use executes instructions including a compare/exchange instruction.

8. The method of claim 1, wherein processing each packet on a list of packets includes:
for each packet on the list executing a work request described in the packet and signaling an event upon completing the work request;
checking for the creation of a new list of packets; and
if a new list of packets exists, processing each packet on the new list of packets, otherwise indicating that the critical section is available for use by other executable units.

9. A computerized system comprising:
a plurality of executable units including a first executable unit and a second executable unit, each of said executable units creating a work packet and placing the work packet on a first list;
a critical section of code executed by the first executable unit and operative to process each work packet before allowing entry into the critical section by the second executable unit.

10. The system of claim 9, wherein the executable units are selected from the group consisting of: a thread, a process, and a fiber.

11. The system of claim 10, wherein the critical section of code manages a shared resource.

12. The system of claim 11, wherein the shared resource is a file maintained by a database server, said file containing a log of operations performed by the server.

13. The system of claim 12, wherein the database server is selected from the group consisting of: Microsoft SQL Server, Informix, Sybase, and Oracle.

14. The system of claim 9, wherein entry to the critical section is controlled using a compare/exchange instruction.

15. The system of claim 9, further comprising a second list of work packets, said second list containing work packets added by a subset of the plurality of executable units while the first executable unit is in the critical section of code.

16. A computer-readable medium having computer-executable instructions for executing a method comprising:
preparing a first packet containing a first work request;
determining if a critical section of code is in use by an executable unit; and
if the critical section is not in use, performing the tasks comprising:
  processing the first packet according to the first work request,
  processing each packet on a list of packets, each of said packets processed according to a work request in the packet,
otherwise placing the first packet on the list of packets.

17. The computer-readable medium of claim 16, further comprising:
determining if the first packet has been processed; and
if the packet has not been processed then performing the tasks comprising:
  determining if the critical section of code is in use by an executable unit,
  if the critical section is in use, then waiting for an event defined in the first packet,
  otherwise processing each packet on the list of packets, each of said packets processed according to a work request in the packet.

18. The computer-readable medium of claim 16, wherein the critical section of code controls a shared resource.

19. The computer-readable medium of claim 18, wherein the shared resource is a resource of a database server.

20. The computer-readable medium of claim 19, wherein the database server is selected from the group consisting of: SQL Server, Oracle, Sybase, and Informix.

21. The computer-readable medium of claim 16, wherein the executable unit is selected from the group consisting of: a thread, a process, and a fiber.

22. The computer-readable medium of claim 16, wherein determining it the critical section is in use executes instructions including a compare/exchange instruction.

23. The computer-readable medium of claim 16, wherein processing each packet on a list of packets includes:
for each packet on the list executing a work request described in the packet and signaling an event upon completing the work request;
checking for the creation of a new list of packets; and
if a new list of packets exists, processing each packet on the new list of packets, otherwise indicating that the critical section is available for use by other executable units.

24. A computer comprising:
a processor;
a computer-readable medium;
an operating system supporting a plurality of executable units including a first executable unit and a second executable unit, each of said executable units creating a work packet and placing the work packet on a first list;
a critical section of code executed by the first executable unit and operative to process each work packet before allowing entry into the critical section by the second executable unit.

25. The computer of claim 24, wherein the executable units are selected from the group consisting of: a thread, a process, and a fiber.

26. The computer of claim 24, wherein the critical section of code manages a shared resource.

27. The computer of claim 26, wherein the shared resource is a file maintained by a database server, said file containing a log of operations performed by the server.

28. The computer of claim 27, wherein the database server is selected from the group consisting of: Microsoft SQL Server, Informix, Sybase, and Oracle.

29. The computer of claim 24, wherein entry to the critical section is controlled using a compare/exchange instruction.

30. The computer of claim 24, further comprising a second list of work packets, said second list containing work packets added by a subset of the plurality of executable units while the first executable unit is in the critical section of code.

31. A computer-readable medium having stored thereon a data structure, comprising:

a first data field containing data representing a work request related to a shared resource;

a second data field containing data indicating the status of the work request in the first data field; and a third data field containing an event identifier for an event to be signaled upon completion of the work request represented in the first data field.

* * * * *